June 3, 1952            G. L. TURNER           2,598,865

INDUSTRIAL TRUCK

Filed Oct. 5, 1948                              7 Sheets-Sheet 1

*INVENTOR.*
GEORGE L. TURNER
BY *Walter E. Schriver*
ATTY.

June 3, 1952 G. L. TURNER 2,598,865
INDUSTRIAL TRUCK

Filed Oct. 5, 1948 7 Sheets-Sheet 5

INVENTOR.
GEORGE L. TURNER
BY Walter E. Schirmer
ATTY.

Patented June 3, 1952

2,598,865

UNITED STATES PATENT OFFICE 2,598,865

INDUSTRIAL TRUCK

George L. Turner, Battle Creek, Mich., assignor to Clark Equipment Company, Buchanan, Mich., a corporation of Michigan Application October 5, 1948, Serial No. 52,840

7 Claims. (Cl. 214—113)

This invention relates to industrial trucks of the type used in the lifting, transporting, stacking, and depositing of material in warehouses, factories, yards, docks and the like, and is more particularly concerned with a novel type of industrial truck construction which differs materially from conventional trucks of this type now in use.

One of the primary objects of the present invention is to provide a truck construction of this type in which the operator at all times has clear visibility of the load which is being handled by the truck.

Another object of the present invention is to provide a truck of this type in which the operator moves vertically with the load supporting carriage, so that he is at all times in position to gauge the relationship of the forks, upon which the load is carried, to the load and can manipulate such forks and the truck accurately in order to pick up the load or to deposit the same regardless of whether it is being stacked in high tiers or being removed from such storage places.

Another feature of the present invention is to provide a truck of this type which has a very short turning radius, allowing its use in narrow aisles, in warehouses and the like, and also allowing its entrance into and withdrawal from box cars, so that substantially all of the box car may be loaded by the use of the truck. This differs materially from previous trucks in which because of the longer turning radius, only a portion of the box car could be loaded by the truck, and the remaining portion had to be manually loaded or unloaded.

Still another feature of the present invention is to provide a construction in which the vertical mast which supports the load engaging carriage for vertical movement is fixed in vertical position and consequently does not tilt forwardly or rearwardly, thereby insuring that the loading on the truck will remain substantially constant. In this connection the present design provides for tilting of the load engaging forks independently of movement of the vertical mast.

Still another feature of the present invention is to provide remote control means whereby the operator at all times has the truck under proper control even though he is moving vertically with respect to the truck.

The present truck is designed so that the space between the forward drive wheels is cleared to allow vertical movement of the carriage and the operator, with the load engaging forks projecting forwardly beyond the operator and being arranged for manual control by the operator for extension and retraction. In this connection, each of the drive wheels is independently operable in either forward or reverse direction or can be locked for braking by manual selection of the operator, this being accomplished either through hydraulic means or by the use of an electric drive or air motor. The rear wheels are of the caster type and consequently accommodate sharp turning of the truck, thereby decreasing its turning radius.

The truck of the present invention may be powered by a gasoline engine which drives suitable pumps to develop hydraulic or air pressure sufficient for supplying the motive power to the drive wheels of the vehicle and also provides the hydraulic pressure for raising and lowering the load and for tilting the same either forwardly or rearwardly. The controls for the raising and lowering of the load and the tilting of the load are preferably provided by the use of electric contact means which actuate suitable solenoids in the hydraulic line for opening and closing the respective valves. The control of the motive power is through the use of manually actuated valves under the immediate control of the operator independently of his vertical position relative the mast of the truck. In addition, suitable means is provided for allowing lateral movement, within a limited range, of the load engaging fork members in order to allow their entry into various size pallets.

It is also a feature of the present invention that the present construction can be used as the equivalent of a pusher mechanism for discharging loads from the forks. By holding the truck stationary and withdrawing the forks from below the load, the load is discharged from the truck.

One of the more important features of the present design, along with the extension and retraction of the forks, is the arrangement by which one wheel can be driven in one direction and the other in the opposite direction to secure not only steering control but also a very short turning arrangement in which the truck actually pivots within its own length. This is of utmost importance in narrow aisles and maneuvering in and out of box cars, ships and trucks.

Other objects and advantages of the present invention will appear more fully from the following detailed description, which, taken in conjunction with the accompanying drawings will disclose to those skilled in the art the particular construction and operation of the present invention.

Figure 2:
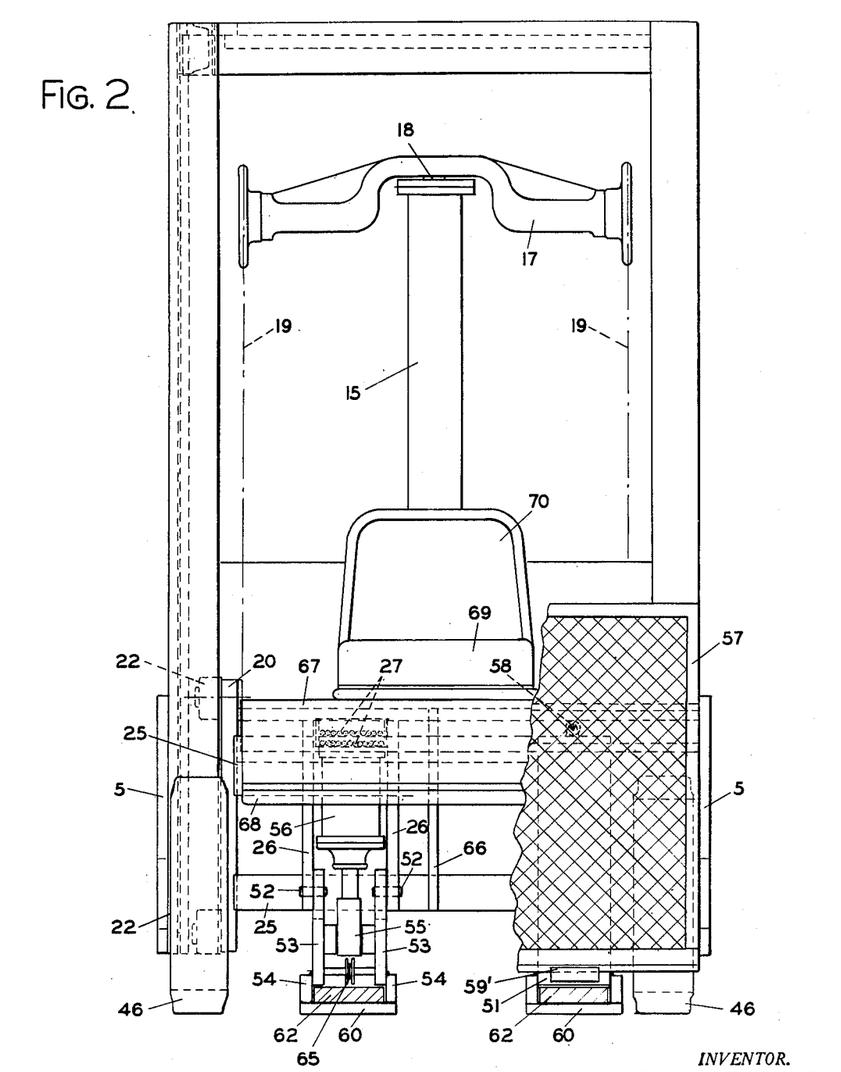
Figure 2 is a front elevational view with portions broken away, of the truck shown in Figure 1.
Figure 3:
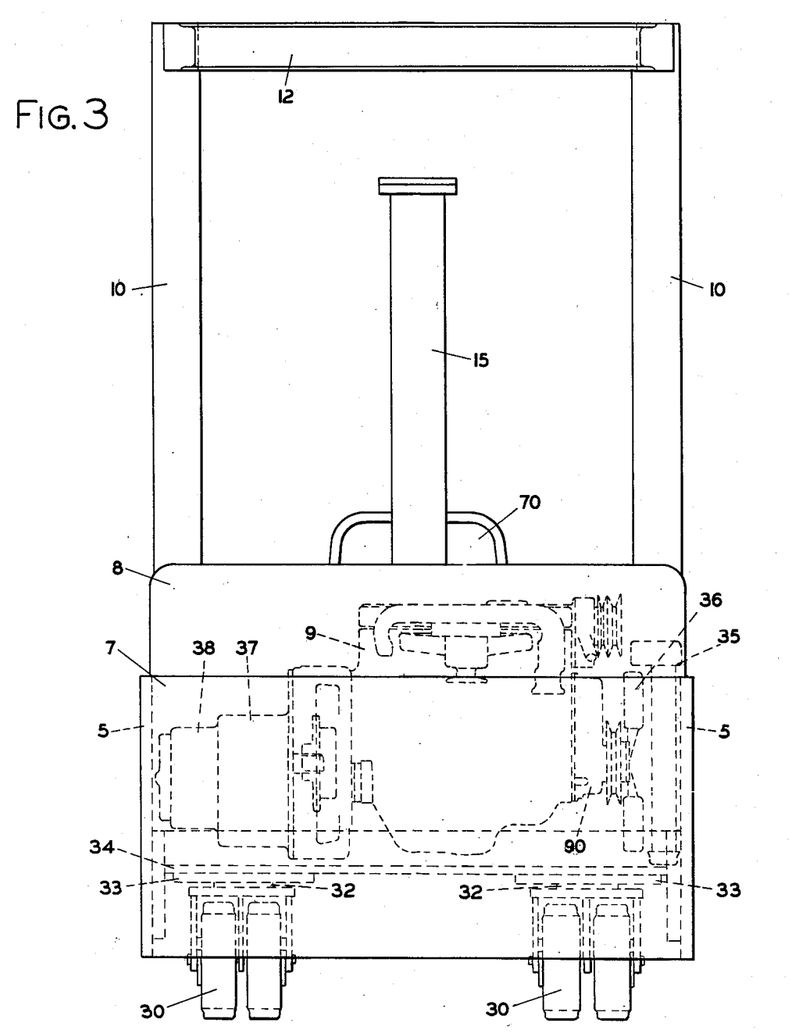
Figure 3 is a rear elevational view of the truck shown in Figures 1 and 2, being a partially diagrammatic view for the sake of clarity.
Figure 4:
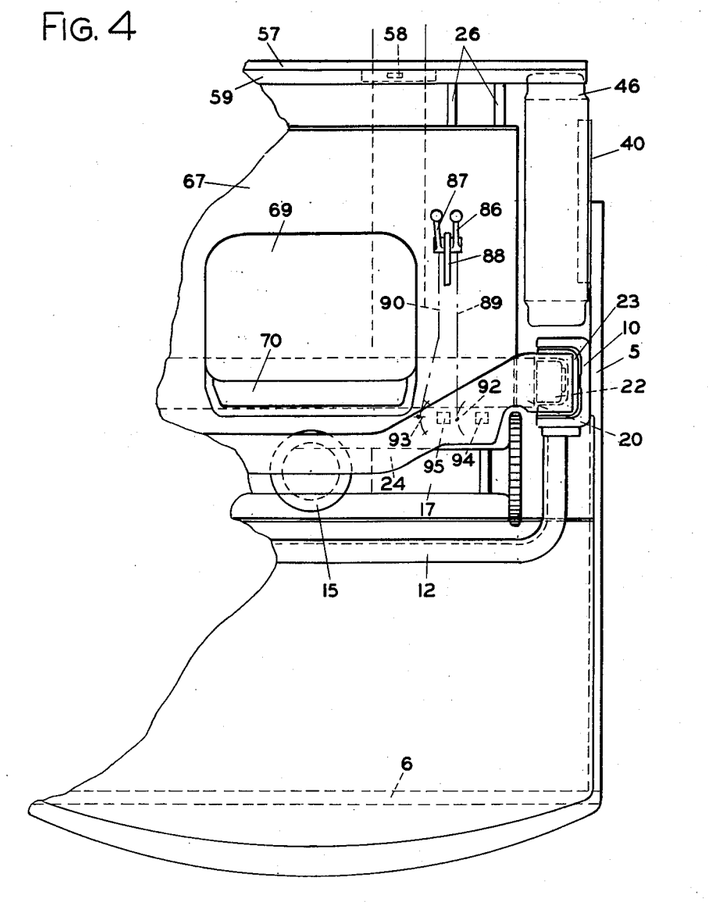
Figure 4 is a partial top plan view of the truck.

Referring now in detail to the truck shown in Figures 1 to 4 inclusive, there is provided a truck frame consisting of the two side plates 5, which are preferably in the form of steel plates suitably cross connected for rigidity and terminating at their rear ends in the transverse plate 6, shown in Figure 4.

Mounted on the transverse plate 6 and extending rearwardly of the truck, is the rounded counterweight member 7, used to counter-balance the load to be carried by the truck. A suitable hood member 8 is provided over the tops of the side frame members 5 and the top of the counterweight 7 for enclosing the motor, indicated diagrammatically at 9, which is preferably rubber mounted upon suitable cross members carried between the side plates 5.

Upright members or channels 10 are rigidly secured to the inner face of the side frame members, as shown in Figure 4, these upright members forming a vertical mast and preferably being cross connected by the U-shaped connecting channel 12 at the upper end thereof and having a second connecting channel 13 forwardly of the hood 8 and mounted upon frame members 14 secured above the counterweights.

A hydraulic lift cylinder 15 is suitably supported centrally between the side plates 5 upon a cross channel member, and the piston within such cylinder 15 preferably carries a suitable cross-head, indicated at 17 in Figures 2 and 4, upon the extending portion 18 of the piston rod adapted to receive chain members 19, indicated diagrammatically, which are anchored to the frame member at one end and at the other end engage a suitable load supporting carriage 20, mounted upon rollers 22 for vertical movement within secondary channel-shaped uprights 23, telescopically mounted in the uprights 10 and connected at their upper ends by a cross member 24. The load supporting carriage 20 includes a vertical frame interconnecting the vertically spaced rollers 22, secured in each of the opposite telescoping channel members 23 and includes two vertically spaced transversely extending plate members 25 upon which is mounted a frame member 26, this frame member having suitable bearing means 27 at the upper end and adjacent the lower end thereof for slidably supporting the frame member 26 for transverse movement of the plates 25, so that it can be shifted laterally from one position to the other.

The rear end of the truck is preferably supported upon a pair of dual caster wheels, indicated generally at 30 in Figure 3, which caster wheels are rotatably supported through the bearing journals 32, upon a frame plate 33, carried by a transversely extending frame member 34 below the engine 9. The engine 9 is preferably provided with a suitable radiator 35, adjacent the fan 36 thereof and at its rear end is adapted to drive a pair of pump members 37 and 38 which will be described in more detail hereinafter.

Figure 5:
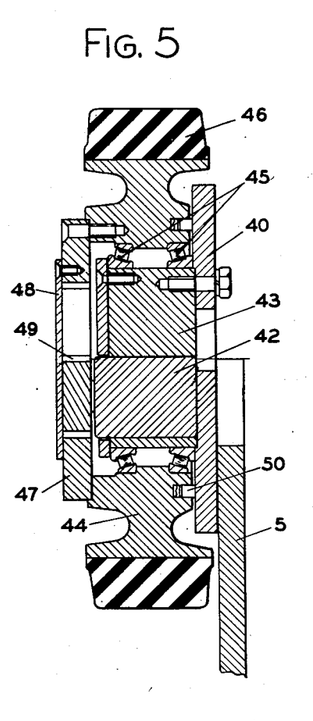
Figure 5 is a horizontal sectional view through one of the drive wheels of the truck.
Figure 6:
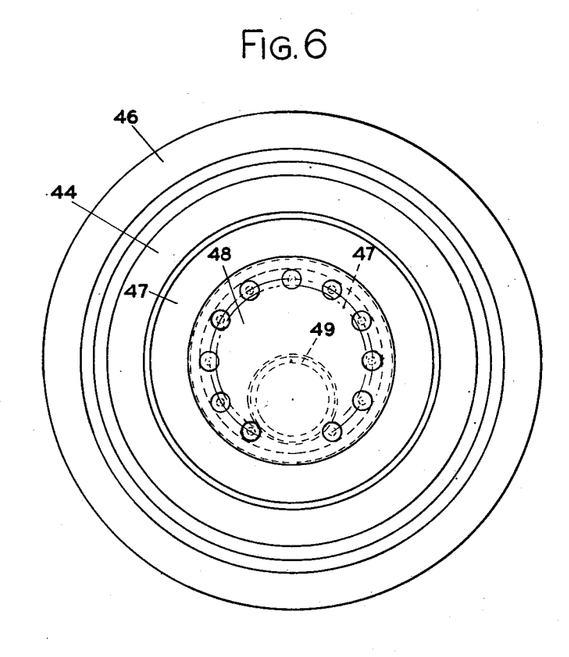
Figure 6 is a side elevational view of the wheels shown in Figure 5.

The forward ends of the two side frame members 5 are recessed and adapted to support circular plate members 40, which may be welded or otherwise suitably secured thereto and which carry a driving motor consisting of a pair of pump members 42 and 43 about which the rim member 44 is mounted as by means of the bearing assemblies 45. The rim member 44 is adapted to carry a hard rubber tire 46 thereon, although this may be a pneumatic tire in cases where a pneumatic tired truck is desired.

Mounted on the inner face of the rim member 44 is a ring gear element 47, preferably closed by a suitable plate 48 and adapted to be engaged by a pinion gear 49, carried on one of the pump or motor elements 42. Upon admission of oil under pressure to the motor element 42—43, a rotative torque is applied to the member 42, for rotating the pinion 49 and consequently driving the wheel which rotates about the bearings 45. Suitable sealing means is provided for preventing leakage of oil, such sealing means being indicated as annular interconnecting seal means 50, carried by the plate 40. The details of operation of the drive wheels will be described in more detail later in conjunction with the description of the hydraulic control system.

Figure 1:
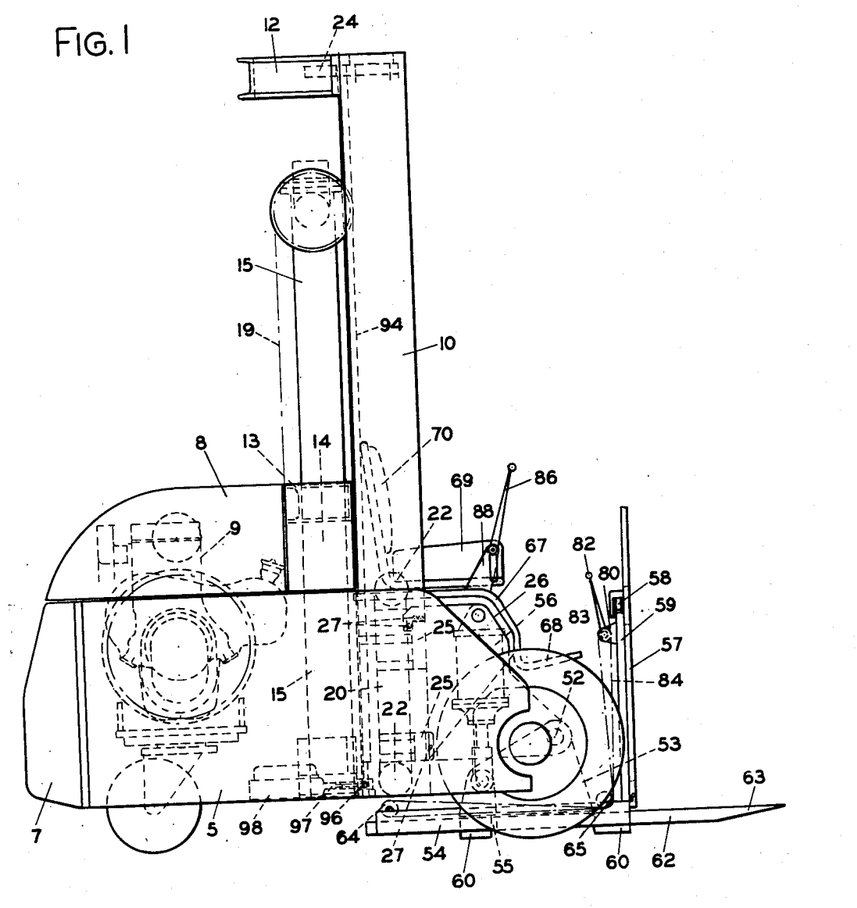
Figure 1 is a side elevational view of a truck embodying the present invention.
Figure 7:
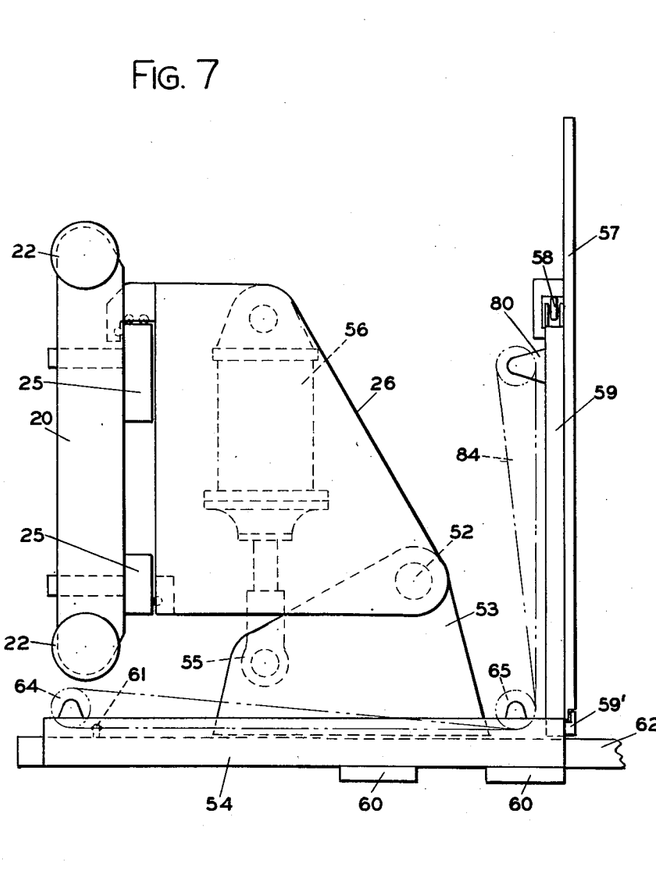
Figure 7 is a side elevational view of the load supporting carriage of the truck.
Figure 8:
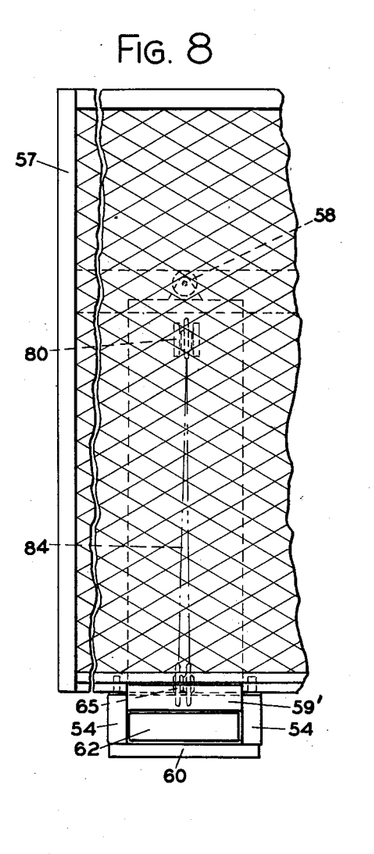
Figure 8 is a detail view of the fork supporting mchanism.

Considering now Figures 1, 4, and 7, the forwardly extending frame members 26, which are duplicated for providing support for each of the lift forks, are carried upon the transverse face plates 25 of the load supporting carriage, and are provided with a pivot or cross shaft 52 upon which is mounted a pair of depending plate members 53, which carry suitable fork receiving assemblies, indicated generally at 54. The plate member 53 is adapted to have connected thereto the extending end 55 of a piston operable within a cylinder 56 pivotally mounted adjacent its upper end on the frame plates 26. Actuation of the piston within the cylinder 56 will cause rotation of plate 53 about the pivot 52 to provide either forward or rearward tilting of the fork housing 54 and the associated rack member 57 supported on and extending vertically therefrom. The rack member 57 is mounted for transverse sliding movement by means of the rollers 58 upon a fixed vertical plate 59 supported on the housing 54, and is held against tilting by the bottom lip brackets 59' carried on the plate.

The housing 54 is provided with transversely extending bottom cross members 60, which close the lower end of the rack as indicated in Figure 2, the forks themselves being indicated by the reference numeral 62 and having forwardly extending chisel-shaped ends 63. It will be seen that the fork housing 54 with the cross plates 60, forms a channel-shaped recess for receiving the forks 62. Suitable pulley members 64 and 65 are carried by the sides of the fork housing and have a continuous chain trained over them and connected to a clip 61 secured to the fork. This chain is for extending and retracting the fork in the channel of the fork housing as will be further described hereinafter. As will be seen from Figure 2, two such sets of fork housings and pivoted plates 53 are provided, one for each of the forks, depending from the frame members 26 supported on the roller bearings 27 for movement on the transverse plates 25, and the fork is contained against vertical movement by a top plate 51 between the side plates 54.

Extending forwardly from the load supporting carriage 20 on the outside of the frame plates 26 is a bracket member 66, which forms with the frame member 20 a support for the platformlike structure, indicated generally at 67, which projects forwardly from the carriage member 20 and has a foot board portion 68 for receiving the feet of the operator. Mounted upon this frame member 67 is an operator seat including a seat portion 69 and a back portion 70, whereby the seat is mounted rigidly with the load supporting carriage 20 for vertical movement therewith. Preferably this seat is located centrally with respect to the longitudinal axis of the truck, and since the lift cylinder 15 as well as the uprights 10 and the upright assembly, are in the rear of the seat 69, it will be apparent that the operator has an entirely unobstructed view over the rack 57 to observe the position of the forks 62 and their engagement with the load.

Mounted on the rear of the stationary portion 59 of the rack 57 is a suitable bracket member 80 upon which is mounted a manually controllable lever 82, which is provided with a pulley portion 83 and suitable cable or chain means 84 trained over the pulleys 64 and 65 carried by the fork housing 54 and preferably connected to the fork 62 by the clip 61 in such manner that upon operation of the lever 82 in one direction or the other, the forks 62 can be extended forwardly through the rack housing 54 or retracted rearwardly between the drive wheels 40 and beneath the load supporting carriage 20 intermediate the side frame members 5.

This retraction of the forks 62 further materially decreases the turning radius of the truck when no load is carried thereby, allowing it to withdraw from a box car or the like after the load has been deposited, or to enter into such box car and then project its forks forwardly to engage the load. Any suitable type of ratcheting mechanism may be employed in this connection to allow the operator to move the forks forwardly or rearwardly by operation of the lever 82.

It is also contemplated that this could be accomplished hydraulically or electrically, as well as manually. Any suitable power control system, driven either from the motor or the truck battery, might be used.

Mounted upon the supporting plate member 67 for the operator seat, are a pair of manually controllable actuating levers 86 and 87 respectively, preferably pivotally supported upon a bracket 88 mounted on the plate 67 and having rearwardly extending connecting arms, indicated diagrammatically in Figure 4 at 89 and 90 respectively, which engage suitable segmental actuating cranks 92 and 93 respectively, supported for vertical sliding movement upon control posts 94 and 95. These control posts 94 and 95, as shown in Figure 1, extend vertically the full length of the uprights 10 and at their lower ends have crank arms shown at 96, for engagement with suitable valve rods 97 contained within valve assemblies 98 mounted in the base of the truck between the side frame members 5. Since the crank arms 92 and 93 move vertically with the load supporting carriage, the operator has control of the turning of the vertical bars 94 and 95 at any position with respect to the mast 10, and consequently has remote control of the valves 98 which control the operation of the wheel driving motors for moving the truck either forwardly or rearwardly for turning the same or for braking the truck.

Considering now the operation of the vehicle, the engine shown at 9, in Figure 3, is provided in addition to the pumps 37 and 38, with a fluid pressure pump 100, located at the forward end of the crank shaft and driven thereby, which pump is connected to a suitable valve lying in the same plane as and behind the valve 98 shown in Figure 1. This valve is used for controlling the lift and tilt operations and is connected through suitable pipe lines to the lift cylinder 15 and to the tilt cylinders 56. Controls for operation of these valves preferably are electric with solenoid action, and the remote control of these valves can be had by running control wires to the movable platform adjacent the driver's seat. This provides for raising and lowering of the entire carriage 20, and for tilting of the fork housings, including the rack 57 through control of the tilt cylinders 56.

Figure 9:
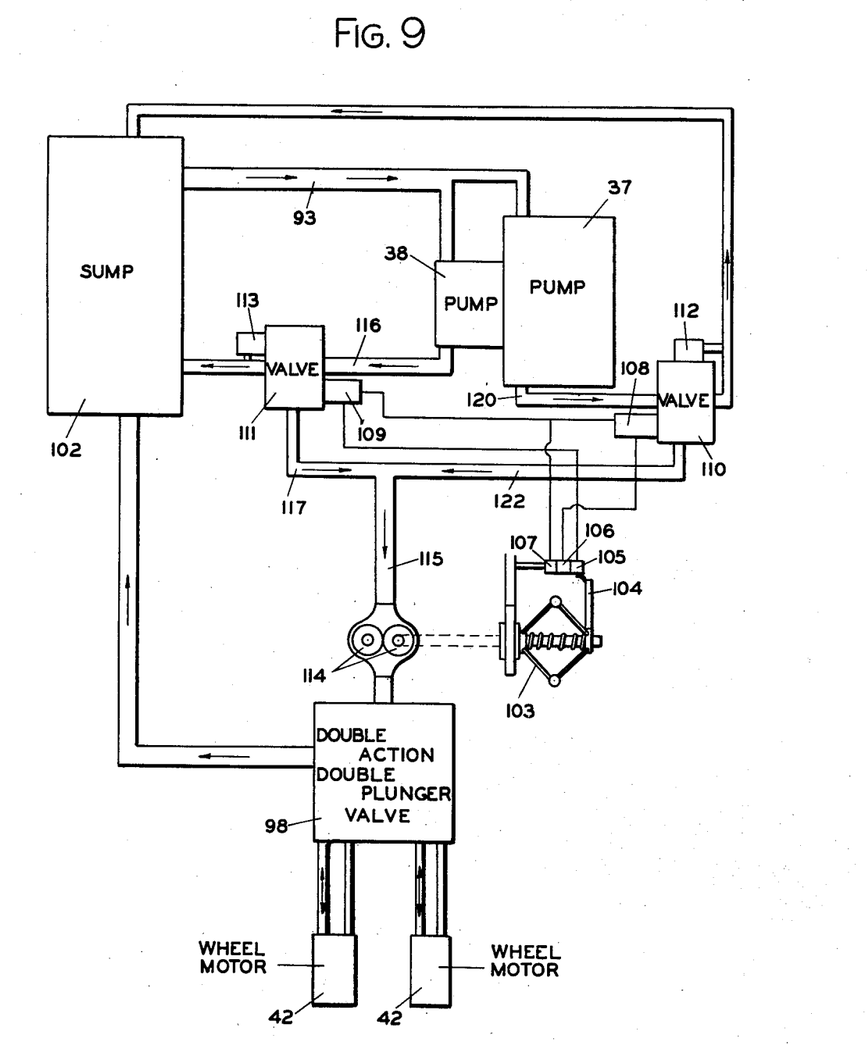
Figure 9 is a diagrammatic view of the hydraulic circuit and control for the truck.

With respect to the drive of the truck, this is accomplished through the control system shown diagrammatically in Figure 9. This control system comprises an oil sump 102, having an outlet conduit 103 leading therefrom to the pumps 37 and 38 driven by the engine 9. The pump 37, as will be noted, is a low pressure, high volume pump and preferably may be of the order of a pump delivering approximately sixty-five gallons per minute at 1660 pounds per square inch maximum. The volumetric flow from the two pumps will determine the ratio of drive between the engine and the drive wheels 46. Preferably three ratios can be provided by this system, the first being a thirty-six to one ratio using the smaller pump 38, which provides delivery of approximately twenty-five gallons per minute at 3300 pounds per square inch, or a sixteen to one ratio when pump 37 is used. A combination of both pumps will produce a twelve to one ratio between the engine and the drive wheels.

These pumps preferably are controlled by a governor mechanism indicated generally at 103, carrying a contact arm 104, arranged to selectively engage contact blocks 105, 106, and 107. These contact blocks are, in turn, connected to solenoids 108 and 109. These solenoids control valves 110 and 111, respectively, the valve 110 being a single section, single action valve having a relief bypass 112, while the valve 111 is a single section, single action solenoid actuating valve having relief bypass 113. The governor is preferably driven through a pair of gears 114 located in the main drive line 115, leading to the control valve 98 controlled by the operator through the control handles 86 and 87.

The control valve 98 is a double action, double plunger type valve, with an open center and is under the manual control of the operator. When the governor is in the position shown in Figure 9, solenoid 109 is actuated to open valve 111, allowing high pressure, low volume delivery from pump 38 through lines 116 and 117 to the line 115 leading to the valve 98. This provides for a low speed drive to the wheel motors, indicated generally at 42 in Figure 9, for driving the vehicle and because the control levers 86 and 87 have an open center portion, it is obvious that these levers may be simultaneously operated to provide forward drive to both wheels or to provide selective drive to each of the wheels for turning or for braking one wheel and allowing the other to turn, thereby giving the truck a very short turning radius.

As the vehicle begins to speed up, the flow through line 115 is increased, causing the governor 103 to move contact arm 104 into engagement with the contact 106, thereby actuating solenoid 108 and opening valve 110 to allow fluid under pressure from pump 37 to flow through lines 120 and 122 to the main delivery line 115 and thence to the valve 98. At the same time, valve 111 is closed and a second or intermediate ratio is provided for drive from the engine to the wheel motors.

As the speed of the vehicle further increases, the contact arm 104 is moved into engagement with contact 107, which opens both valves 110 and 111, providing for delivery of approximately ninety gallons per minute at 1100 pounds per square inch to the main line 115, thereby giving a high speed drive to the driving motors 42. Since the engine speed is variable, there is a flexibility obtained of drive torque through the variations of pressure in volume by selective actuation of the respective pumps. The use of the open center valve 98 permits the drive of both wheels in one direction; also driving of either wheel independently or the driving of one wheel in one direction and the other in the opposite direction.

Since this is possible, it is apparent that the drive power can also be used to steer, inasmuch as the trailing wheels 30 are of the caster type. This moves the center of the turning radius of the truck from a point outside the drive wheel to a point half way between the drive wheels when the wheel motors are driven in opposite directions.

It will also be apparent that by moving the uprights to the rear of the drive wheels and the removal of any differential or connection between the drive wheels, a space is provided for retraction of the forks which allows a decrease in the axial space required for operation of the truck and also enables a truck of this type to load a much greater portion of a box car or the like.

While manual retraction and extension of the forks is disclosed, it is obvious that this could be controlled by either hydraulic or electrical control means. Inasmuch as the uprights do not tilt, the stability of the truck is increased since the center of gravity of the load is not moved forward when the load is lifted and the upright tilted forwardly. The forks are capable of retraction at any point in the vertical lift of the load supporting carriage.

It is therefore submitted that the present invention provides an improved type of industrial truck having a greatly increased turning radius because of the retractable forks and control of each of the drive wheels independently. In addition, the visibility of the driver is greatly improved, since he rides with the fork housing and has at all times a clear view of the load which the forks are engaged.

While variations may be made in the control system and in details of the design of the present truck, it is to be understood that I do not intend to be limited to the particular structure herein disclosed, but only insofar as defined by the scope and spirit of the appended claims.

I claim:

1. In an industrial truck having a fixed vertical mast intermediate the ends thereof, a load supporting carriage mounted for vertical movement thereon, an operator's platform and projecting load engaging fork and rack assembly secured to and movable with said carriage, means for independently tilting said fork and rack assembly, parallel fork housings in said assembly, lift forks therein, and means for retracting said forks beneath said platform or extending them outwardly forwardly of said rack.

2. An industrial truck having a forwardly opening U-shaped frame portion, a fixed vertical mast at the rear of said frame portion, an operator's platform and load-engaging fork assembly mounted for vertical movement on said mast, individual drive wheels at the forward ends of said frame outboard of said platform, a power developing system on said truck, and control means on said platform and movable therewith for selectively actuating either or both of said drive wheels.

3. In an industrial truck, a fixed vertical mast, a load supporting carriage guided for vertical movement in said mast, a pair of lift fork housings, means mounting said housings on said carriage and providing for lateral shifting movement thereof, means associated with said housings for controlling tilting movement thereof, and fork members in said housings arranged for extension and retraction with respect thereto.

4. An industrial track having a fixed vertical mast intermediate the ends thereof, spaced independent drive wheels at the forward end of the truck, a load supporting carriage mounted for vertical movement in said mast and carrying a forwardly projecting load engaging portion disposed between said drive wheels when in lowered position, means for tilting said load engaging portion independently of said mast, an engine mounted transversely of said truck rearwardly of said mast, fluid pressure developing means driven by said engine, and fluid pressure motors at said wheels connected to said pressure developing means.

5. An industrial truck having a fixed vertical mast intermediate the ends thereof, spaced independent drive wheels at the forward end of the truck, a load supporting carriage mounted for vertical movement in said mast and carrying a forwardly projecting load engaging portion disposed between said drive wheels when in lowered position, means for tilting said portion independently of said mast, and an operator's platform mounted on said carriage above said load engaging portion and movable therewith.

6. An industrial truck having a horizontally extending U-shaped main frame, a vertically extending mast mounted at the bight portion of said main frame, a load supporting carriage guided for vertical movement in said mast, an operator's platform mounted for vertical movement with said load supporting carriage, drive wheels mounted at the outer ends of the projecting legs of said main frame, prime mover means for powering said drive wheels, and control means on said platform for effecting actuation of said drive wheels by said prime mover.

7. An industrial truck having a vertically extending mast, a load supporting carriage guided for vertical movement in said mast, forwardly extending frame means slidably mounted on said load supporting carriage for movement transversely of said truck, fork housings pivotally mounted to said frame means, means for tilting said fork housings, fork members disposed in said fork housings, and means for extending and retracting said fork members relative to said fork housings.

GEORGE L. TURNER.

(References on following page)

REFERENCES CITED

The following references are of record in the file of this patent:

UNITED STATES PATENTS

| Number | Name | Date |
|---|---|---|
| 832,518 | Wolcott | Oct. 2, 1906 |
| 1,411,652 | Willard | Apr. 4, 1922 |
| 1,417,013 | Andrews | May 23, 1922 |
| 1,526,993 | Luce | Feb. 17, 1925 |
| 1,875,103 | Mosel | Aug. 30, 1932 |
| 1,878,995 | Abbe | Sept. 27, 1932 |
| 1,900,569 | Lederer | Mar. 7, 1933 |
| 1,926,692 | Tarbox | Sept. 12, 1933 |
| 2,046,517 | Jones | July 7, 1936 |
| 2,254,104 | Joy | Aug. 26, 1941 |
| 2,261,483 | Nickles | Nov. 4, 1941 |
| 2,347,368 | Rosen | Apr. 25, 1944 |
| 2,361,333 | Towson | Oct. 24, 1944 |
| 2,375,104 | Heitshu | May 1, 1945 |
| 2,410,030 | Horni | Oct. 29, 1946 |
| 2,427,301 | Puim | Sept. 9, 1947 |
| 2,450,152 | Miller | Sept. 28, 1948 |
| 2,451,943 | Gunning | Oct. 19, 1948 |
| 2,479,623 | Johnson | Aug. 23, 1949 |
| 2,536,068 | Lehmann | Jan. 2, 1951 |